(12) United States Patent
Meier et al.

(10) Patent No.: US 8,031,331 B2
(45) Date of Patent: Oct. 4, 2011

(54) COORDINATE MEASUREMENT INSTRUMENT

(75) Inventors: Dietrich Meier, Niedererlinsbach (CH);
Roland Zumbrunn, Wittinsburg (CH);
Thomas Jensen, Rorschach (CH);
Bernhard Braunecker, Rebstein (CH)

(73) Assignee: Leica Geosystems AG, Heerbrugg (CH)

( * ) Notice: Subject to any disclaimer, the term of this patent is extended or adjusted under 35 U.S.C. 154(b) by 306 days.

(21) Appl. No.: 12/160,694

(22) PCT Filed: Jan. 4, 2007

(86) PCT No.: PCT/CH2007/000005
§ 371 (c)(1),
(2), (4) Date: Sep. 25, 2008

(87) PCT Pub. No.: WO2007/079600
PCT Pub. Date: Jul. 19, 2007

(65) Prior Publication Data
US 2010/0253931 A1 Oct. 7, 2010

(30) Foreign Application Priority Data
Jan. 13, 2006 (CH) .......................................... 59/06

(51) Int. Cl.
*G01C 3/08* (2006.01)
(52) U.S. Cl. ..................... 356/4.01; 356/3.01; 356/3.15; 356/4.1; 356/5.01; 356/5.1
(58) Field of Classification Search ........ 356/3.01–3.15, 356/4.01–4.1, 5.01–5.15, 6–22, 28, 28.5
See application file for complete search history.

(56) References Cited

U.S. PATENT DOCUMENTS

| | | | |
|---|---|---|---|
| 6,847,436 B2 | 1/2005 | Bridges | |
| 2003/0020895 A1 | 1/2003 | Bridges | |
| 2003/0048355 A1* | 3/2003 | Shimoyama et al. | 348/79 |

FOREIGN PATENT DOCUMENTS

| | | |
|---|---|---|
| DE | 10235888 A1 | 2/2003 |
| EP | 0759538 A2 | 2/1997 |
| EP | 1493990 A1 | 1/2005 |
| EP | 1610092 A1 | 12/2005 |
| WO | 03/062744 A1 | 7/2003 |

* cited by examiner

*Primary Examiner* — Thomas Tarcza
*Assistant Examiner* — Luke Ratcliffe
(74) *Attorney, Agent, or Firm* — Rankin, Hill & Clark LLP (57) ABSTRACT

A coordinate measurement instrument includes an optical distance measurement device (200, 300) for measuring the distance from an auxiliary measurement means (5) which can move in space, a zoom camera (106), which can rotate with respect to at least two axes, with a zoom lens, and an overview camera (104) for coarse localization of the auxiliary measurement means (5). A light exit and light receiving optical system (101, 102) of the distance measurement device (200, 300), the zoom camera (106) and the overview camera (104) are arranged on a shared carrier (1) which can rotate with respect to at least two axes (A, Z). The optical axis (111) of the distance measurement device (200, 300) and the optical axis of the overview camera (104), preferably extend coaxially outside the coordinate measurement instrument. Sub-units of the distance measurement devices (200, 300) are, preferably, arranged on the carrier (1) and on the rotatable intermediate unit (2) and are connected to each other by means of optical waveguides (501-508).

23 Claims, 8 Drawing Sheets

COORDINATE MEASUREMENT INSTRUMENT

BACKGROUND OF THE INVENTION

The invention relates to the field of coordinate measurement apparatus, in particular to a coordinate measurement apparatus with a distance measurement device, with a zoom camera and with an overview camera, according to the preamble of the respective independent patent claims.

DESCRIPTION OF RELATED ART

Such a coordinate measurement apparatus is known for example from WO 03/062744 A1. There, an apparatus is described, in which a moving carrier comprises individual components of two distance measurement devices which are connected to remaining components by means of optical waveguides. Thereby, the remaining components are arranged in a stationary base of the apparatus. The carrier is rotatable about two axes, so that, therefore, the optical waveguides must be movable about these two axes. Moreover, a zoom camera and an overview camera are arranged on the carrier. The beam path of these cameras is coupled into the beam path of the range-finder, so that all beam paths or optical axes run essentially coaxially outside the carrier.

US 2003/0020895 A1 shows an absolute range-finder with which exit optics and optoelectronic components on the one hand are fastened on a moved platform and on the other hand on the base of the apparatus, and are connected to one another by way of optical fibers.

EP 0 759 538 A2 describes a laser system, in which the laser source is set away from the remaining components by way of an optic fiber, for the thermal decoupling.

An automatically collimating measurement device with a picture recording device is described in DE 102 35 888 A1. A picture recorded by the picture recording device is displayed on a display, wherein a measurement point may be marked on the picture with a display device. The measurement device comprises a greatly enlarging, optical collimation camera system. The picture recording device is constructed as a wide angle camera. The beam path of the wide angle camera runs essentially parallel to that of the collimation camera system. The collimation camera system comprises two collimation devices: on the one hand a collimation camera and on the other hand a reticle camera. Both serve for the exact alignment of the collimation camera system onto a target marking, wherein the one tends to be applied out in the open, and the other in closed spaces. If the collimation camera system is aligned, the distance to the target marking is determined with an optical range-finder, whose optical axis runs coaxially to that of the collimation camera system. The wide-angle camera is also considered as a (third) replacement collimation device, and used for the coarse localisation of the target marking. It thus serves as an overview camera. The optical axis of the overview camera and of the distance measurement device accordingly run parallel and separately to one another, thus not coaxially. The two system elements which require a high precision (distance measurement and collimation) are thus arranged coaxially. The system element, which functions in a less precise manner (the overview camera for coarse localisation), is arranged separate and parallel thereto, since the correction of the parallaxes with the transition from the coarse localisation for the exact collimation to the target marking does not need to meet very high demands, in contrast to the transition from the exact collimation to the distance measurement.

EP 1 610 092 A1 shows a measurement apparatus in which a distance measurement device is arranged collinearly to a telescopic sight. The telescopic sight has no zoom function. A picture may be coupled out of the beam path of the telescopic sight onto a first picture sensor. A second picture sensor with its own optics, for detecting a picture, is provided with an aperture angle which is 30 times larger. By way of electronic switch-over, one may selectively represent the picture of the first or the second picture sensor. No means for the tracking of the measurement aid are disclosed, likewise no zoom camera. In one embodiment form, the beam paths of the first and the second picture sensor run collinearly outside the apparatus. However, for this, it is necessary for the common exit optics to have two separate concentric lens systems, i.e. an inner region of the exit lens(es) is formed for imaging to a picture sensor, and an outer region which is arranged annularly about the inner region, is formed for imaging to the other picture sensor.

BRIEF SUMMARY OF THE INVENTION

It is therefore the object of the invention to provide a coordinate measurement apparatus of the initially mentioned type, which improves the accuracy of the measurement with respect to the state of the art.

The object is achieved by coordinate measurement apparatus with the features of the respective independent patent claims.

The coordinate measurement apparatus preferably comprises:
- at least one optical distance measurement device for measuring the distance to a measurement aid movable in space and with a first measurement and control loop for tracking the measurement aid,
- a zoom camera which may be rotated with respect to at least two axes, with a zoom objective and with a second measurement and control loop for keeping constant the size of an image of the measurement aid on an optoelectrical image converter,
- an overview camera for the coarse localisation of the measurement aid,
- wherein light exit optics and the light receiver optics of the distance measurement device, the zoom camera and the overview camera are arranged on a common carrier which may be rotated with respect to at least two axes, wherein the optical axis of the distance measurement device and the optical axis of the overview camera run coaxially outside the coordinate measurement apparatus.

With this, it is possible to achieve an arrangement of the optical components on the carrier, which as a whole particularly saves space.

The at least one distance measurement device is preferably an interferometric measurement apparatus, an absolute value range-finder based on laser beam, or a combination of both. The light exit optics and light receiver optics of the distance measurement device, as well as remaining elements of the distance measurement device, are thus arranged on the carrier and moved with this. At least one collimated light beam for the measurement of the distance to the measurement aid is produced. With a movement of the measurement aid, the displacement of the reflected light beam is detected by a camera or a position-sensitive detector, and is moved by means of the first measurement and control loop of the carrier for tracking the measurement aid.

Thereby, preferably first, a first outcoupling of light to the overview camera is arranged in the beam path of a received light bundle. With this, the overview camera is as close as possible to the exit opening of the optics, and may thus have a large aperture angle. The overview camera, according to its purpose, has a larger aperture angle than the zoom camera. Typically, the aperture angle of the overview camera is 10° or larger, and the aperture angle of the zoom camera may be varied for example between 1° and 10°, depending on the distance of the measurement aid (e.g. 15 m distance at 1° and 1.5 m distance at 10°.

Preferably, a second outcoupling of light to a sensor is subsequent to this, said sensor providing a measurement variable for tracking the measurement aid. This second outcoupling is arranged in the beam of the light component which is not coupled out from the first outcoupling, thus of the continuing light component. This sensor is a position transducer, which detects a position of a light spot on a surface of the transducer. In an alternative embodiment of the invention, instead of the position transducer, the overview camera provides these measurement variables for tracking the measurement aid.

Preferably, the first and the second outcouplings are rotated at least approximately 90° to one another about the axis of the received light. Asymmetries which the continuous light obtains by the mirror of the first outcoupling, are compensated again by way of the mirror of the second outcoupling which is rotated thereto.

In a preferred embodiment of the invention, the beam path of the zoom camera and of the distance measurement are led in each case via separate exit optics, thus biaxially. In other words: the optical axis of the zoom camera and the beam path of the distance measurement device do not run coaxially in the region between the coordinate measurement apparatus and the measurement aid. With this, although the distance between these beam courses must be taken into account on evaluation and coordination of data of the zoom camera and data of the other sensors, the optical construction however is simplified.

In another preferred embodiment of the invention, the optical axis of the zoom camera outside the coordinate measurement apparatus likewise runs coaxially to the optical axes of the distance measurement device and of the overview camera. Here, the optical construction is therefore more complicated, but the evaluation is simpler. For this, preferably a third outcoupling is arranged in the beam path of the light coupled out from the first outcoupling. This third outcoupling is, thus, arranged for coupling out light to the zoom camera.

Thereby, the different cameras or range-finders may be operated simultaneously. This is in contrast to arrangements, with which a deflection of the light is effected via a tiltable mirror, and in which, therefore, individual measurement devices may only be operated in an alternating manner and excluding one another.

Preferably, at least one of the outcouplings is a wavelength-dependent beam splitter. This means that the different cameras and distance measurement devices as well as the position detection at least partly operate in different wavelength regions. With this, it is possible to minimise the mutual influencing of these measurement means. Moreover, it is made possible that in a particular wavelength region, the largest part of the received energy reaches the assigned detector.

In a further preferred embodiment of the invention, an electro-optical image converter of the zoom camera is arranged asymmetrically with respect to the optical axis of the zoom camera, and the middle point of the image converter is displaced away from the optical axis of the distance measurement device.

The coordinate measurement apparatus preferably includes:
  at least one optical distance measurement device
  means for irradiating and for receiving light
  an emitter-receiver unit, which is rotatably arranged with respect to an intermediate unit or a carrier, about an axis, for example an azimuth axis
  an intermediate unit, which with respect to a base unit is rotatably arranged about a further axis, for example a zenith axis which does not run parallel to the first axis, by which means the emitter-receiver unit is rotatably arranged with respect to the base unit about two axes,
  wherein the optical distance measurement device comprises a first sub-unit which is arranged on the emitter-receiver apparatus and moves with this,
  the optical distance measurement device comprises a second sub-unit, and at least one optical waveguide for the transmission of light is arranged between the first and the second sub-unit of the distance measurement device
wherein the second sub-unit is arranged on the intermediate unit and is moved with this.

With this, the optical waveguide or optical waveguides must be led between the sub-units only via a single moved axis.

In a further embodiment of the invention, the second sub-unit of a first range-finder is arranged on the intermediate unit, and the second sub-unit of a second range-finder is arranged in the base unit. The second sub-unit, depending on the type of the range-finder, includes one or more of the following elements: laser light source, modulator, beam splitter, insulator, detector, incoupling in the optical waveguide, etc.

In a preferred embodiment of the invention, at least one optoelectronic detector of the at least one distance measurement device is arranged in the emitter-receiver unit. With this, it is possible to compensate temperature-induced length changes in a first optical waveguide (with for example a measurement beam) by way of analogous length changes in a second optical waveguide (with for example a reflected beam).

In a further preferred embodiment of the invention, an emitted and a returning light beam of the at least one distance measurement device are led through the same optical waveguide between the first and the second sub-unit. A particularly simple guidance of the fiber is possible by way of this.

In another preferred embodiment of the invention, an emitted and a returning light beam of the at least one distance measurement device are led through separate optical waveguides between the first and the second sub-unit. Length changes of optical waveguides may also be compensated with such an arrangement.

A further preferred embodiment of the invention comprises a first and a second distance measurement device. Thereby, the light beams of the two distance measurement devices are in each case led through separate optical waveguides between the first and the second sub-unit. With this, the light beams may be processed separately, and the distance measurement devices may be arranged spatially separate from one another in the intermediate unit. This embodiment includes variants in which the individual range-finders in each case have one or in each case two optical waveguides.

A further preferred embodiment of the invention includes a first and a second distance measurement device with, in each case, an emitted and a returning light beam. Thereby, at least one of the light beams of the first distance measurement device and one of the light beams of the second distance measurement device are led through the same optical waveguide between the first and the second sub-unit. With this, on the one hand, it is possible to achieve a compensation by way of dual optical waveguides running parallel, for at least one of the range-finders, and on the other hand to reduce the number of optical waveguides by way of a dual use for both range-finders.

A further preferred embodiment of the invention includes a first and a second distance measurement device with, in each case, an emitted and a returning light beam. Thereby, all light beams of the first as well as the second distance measurement device are led through the same optical waveguide between the first and the second sub-unit. With this, the number of optical waveguides is minimal. For compensating temperature fluctuations, the optical waveguide preferably includes an integrated temperature measurement, for example by way of a resistance wire running parallel and close to the optical waveguide.

In a further preferred embodiment of the invention, a light source is arranged in the intermediate unit and forms the second sub-unit. The remaining elements of the at least one distance measurement device, thus, form the first sub-unit and are arranged in the emitter-receiver unit.

In further preferred embodiment forms of the invention, individual sub-units of the at least one distance measurement device are also arranged on the base unit. For example, three sub-units of a distance measurement device are distributed such that exit optics are arranged on the emitter-receiver unit, a detector unit is arranged in the intermediate unit, and a light source on the base unit. Or a light source and a detector unit of a first range-finder are arranged on the intermediate unit, and a light source and a detector unit of a second range-finder are arranged on the base unit. Basically therefore, sub-units with a different functionality may be distributed over the emitter-receiver unit, the intermediate unit and the base unit, in order to obtain an optimal combination of optical, thermal-technical and mechanical characteristics.

In a preferred embodiment of the invention, a lambda/4 plate or quarter-wave plate is arranged in the beam path of the emitted as well as returning light of at least one of the at least two range-finders, in the emitter-receiver unit. With this, a rotation of the emitted light with respect to the received light is effected in the optical waveguide or guides, by which means delays dependent on polarisation, and other asymmetries of the optical waveguides and of further optic elements may be compensated. For this reason, the quarter-wave plate is attached as close as possible to the light exit optics.

Further preferred embodiments are to be deduced from the dependent patent claims.

BRIEF DESCRIPTION OF THE DRAWINGS

The subject matter of the invention is hereinafter described by way of preferred embodiments, which are represented in the accompanying drawings. In each case, in a schematic manner there are shown in.

The reference numerals used in the drawings and their significance are listed in a conclusive manner in the list of reference numerals. Basically, the same parts are provided with the same reference numerals in the figures.

DETAILED DESCRIPTION OF THE INVENTION

Figure 1:
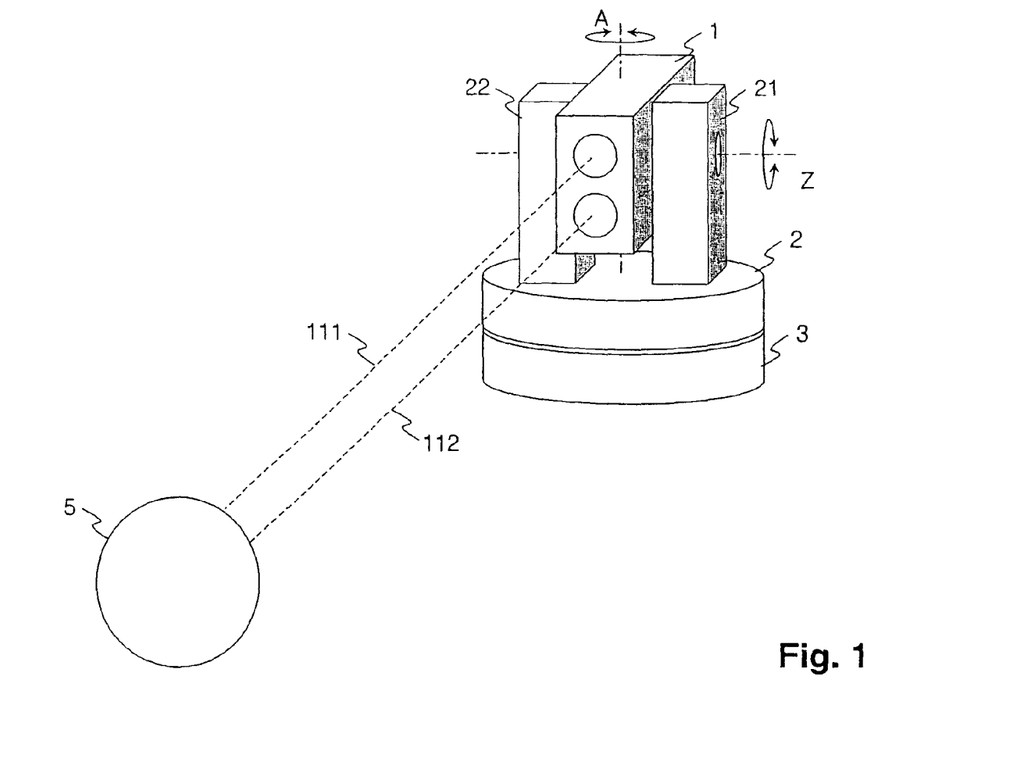
FIG. 1 a coordinate measurement apparatus.

FIG. 1 schematically shows a construction of a coordinate measurement apparatus, comprising an emitter-receiver unit 1 movable about two axes, an intermediate unit 3 movable about an axis, and a base unit 3. The intermediate unit 2 is rotatable with respect to the base unit 3 about a vertical or azimuth axis A, and the emitter receiver unit 1 is rotatable with respect to the intermediate unit 2 about a horizontal zenith axis or elevation axis Z. Thereby, the intermediate unit 2 comprises a first support 21 and a second support, in which the emitter receiver unit 1 is mounted on the left and right. The invention may however also be realised in an arrangement with a single-sided mounting of the emitter-receiver unit 1 via only one support.

Optical elements for the light exit and light receipt of different measurement cameras and range-finders of the apparatus are arranged on the emitter-receiver unit 1. These optical elements are moved together with the emitter-receiver unit 1 and by way of closed loop control devices are directed onto a target or measurement aid 5 in accordance with the received light and are automatically tracked to this target. In a known manner, the position of the target 5 is determined from the measured rotation of the emitter-receiver unit 1 about the azimuth axis A and the zenith axis Z, as well as from the distance to the target 5. Markings on the target 5 are detected with a zoom camera 106, and in a known manner, the spatial orientation of the target 5, thus the orientation about the three coordinate axes, is determined from this.

Hereinafter, different arrangements are described, which on the one hand differ in the arrangement of the measurement camera on the emitter-receiver unit 1, as well as on the other hand in the division of the range-finder onto the emitter-receiver unit 1 and the intermediate unit 2. Further combinations of camera arrangements with range-finder arrangements, which likewise fall within the scope of the invention, are to be deduced therefrom without further ado.

Figure 2:
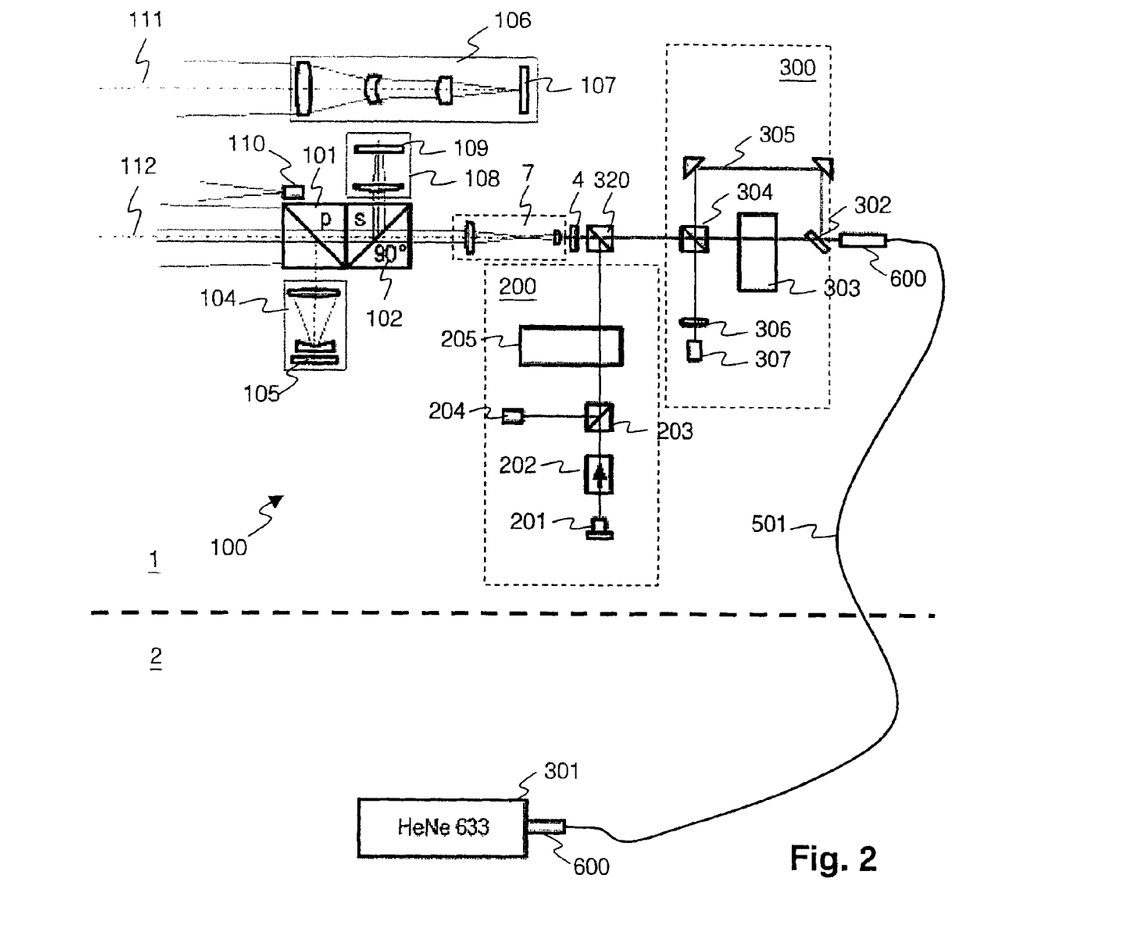
FIG. 2 an arrangement with a separated laser light source.

FIG. 2 shows an arrangement with a separated laser light source 301. This arrangement comprises a carrier arrangement 100 on which different cameras 104, 106, a position transducer 108, and an absolute range-finder (ADM) arrangement 200 and an interferometer arrangement 300 are arranged, and are moved with the carrier arrangement 100. What does not move with the carrier arrangement 100, but is set away via an optical waveguide 503, is a HeNe-laser 301 for the interferometer arrangement 300. The HeNe-laser 301 is arranged on the intermediate unit 2.

The carrier arrangement 100 comprises a first outcoupling 101 which separates light which is incident along an optical axis 112 of the range-finder from the outside into the carrier arrangement 100. A part of this light is coupled out to an overview camera 104. The overview camera 104 has its own optics and an image converter 105. The overview camera 104 typically has an aperture angle of about 10 degrees and a focal width of for example 30-50 mm and serves for the coarse localisation of measurement targets 5. For detecting reflected targets 5, the carrier arrangement 100 preferably comprises a reflector illumination 110 which illuminates an angle region which is preferably at least as large as the aperture angle of the overview camera 104. The diameter of the outcouplings 101, 102, 103 is for example about 20-25 mm.

Evaluation electronics and/or evaluation software of the overview camera 104, for example, detects one or more particularly bright light points in the viewing region of the overview camera 104, which thus correspond in each case to a reflecting target 5. From this, their position in the picture of the overview camera 104 is evaluated, and in turn from this, a change of the axis positions which align the carrier arrangement 100 and the light beams of the range-finder or meters, onto the target 5. Thus with this, an automatic target detection and a lock-on of the range-finder onto a target 5 is possible.

The light which is not coupled out by the first light outcoupling reaches a second outcoupling 102 which couples out a part of the light to a position transducer 108. This light component is a beam bundle of the returning-back light of one of the range-finders 200, 300, preferably from the interferometer arrangement 300. The position transducer 108 has its own optics and, for example, a position-sensitive diode 109. This provides analog signals which represent the position of the beam bundle in two dimensions on a surface of the position sensitive diode 109. Alternatively to this, sensor arrays or image converters (CCD, CMOS, etc) with an associated digital signal processing, may be used for determining the position. A tracking controller, according to the thus evaluated position, controls a displacement of the position of the emitter-receiver unit 1 with a closed loop, so that the light beam follows a movement of the reflecting target 5.

The spatial arrangement of the first outcoupling 101 and of the second outcoupling 102 is only shown schematically in the figure. The orientation of the light incidence plane of the light coupled out by the first outcoupling 101 indeed actually runs parallel ("p") to the plane of the drawing. The orientation of the light incidence plane of the light coupled out by the second outcoupling however runs perpendicularly ("s") to the plane of the drawing, and is only folded into the plane for the purpose of representation. The influence of the first outcoupling 101 on the measurement beams, which causes an asymmetry in the measurement beam, is compensated by the influence of the second out-coupling 102. The asymmetry is a phase shift between the vertically and the horizontally polarised components of the light.

A zoom camera 106 is likewise arranged as a part of the carrier arrangement 100 on the emitter-receiver unit 1. The zoom camera 106 has its own light entry optics, and thus its own optical axis 111 which outside the emitter-receiver unit 1 does not coincide with the optical axis 112 of the previously described elements, but preferably essentially parallel to this. This arrangement is hereinafter called a biaxial arrangement. The zoom camera 106 detects markings of a target 5 on an image converter 197. The orientation of the target 5 is evaluated on account of the image of the markings in the known manner, and furthermore the zoom factor of the zoom camera 106 is controlled such that the image of the target 5 onto the image converter 107 has essentially always the same size. For example, the zoom camera 106 has a 10-fold zoom with a focal width of 50 to 500 mm enlargement.

In a preferred embodiment of the invention, the beam path of the zoom camera 106 is parallel to the beam path of the range-finder 200, 300 outside the emitter-receiver unit 1. If the target 5 is detected and tracked, the light beam of the range-finder 200, 300 is permanently aligned onto a reflector of the target 5. Thereby, as a rule, special reflecting or self-illuminating marking points are visible from the target, and the image of these marking points permits the evaluation of the orientation of the target 5. Thus seen from the zoom camera, the target 5 is always shifted by the distance of the parallel beam paths 111, 112. Moreover, the zoom automatics keep the size of the image of the target 5 constant. For this reason, the imaging of the target 5 onto the image converter 107 of the zoom camera 106 is always displaced by the same distance with respect to the optical axis 111 of the zoom camera. For this reason, preferably also the image converter 107 is arranged displaced with respect to the optical axis 111 of the zoom camera 106. The optical axis 111, thus, does not lead through the middle of the image converter 107. With this, the image converter 107 is utilised in an optimal manner, and the evaluation of the picture data may be effected more efficiently. Alternatively, it is possible to arrange the image converter 107 such that although it is not displaced, a strip of the picture points which lies on the side of the range-finder beam, is not read out or not to be taken into account in the picture processing.

Figure 3:
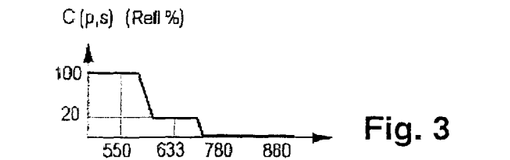
FIG. 3 reflection characteristics of outcouplings applied therein.

The measurement means such as the overview camera 104, the zoom camera 106, the position transducer 108 and the two range-finders 200, 300, preferably function with different wavelength regions. FIG. 3 schematically shows reflection characteristics C(s, p), corresponding to this, of outcouplings as are applied in the arrangement according to FIG. 1. The horizontal axis indicates the wavelength, and the component R of reflected light in percent is plotted along the vertical axis. The first outcoupling 101 reflects, which means couples out, preferably the whole component of ingoing light in the wavelength region of 550 nm and below. The overview camera 104 is optimised for operation in a region about 550 nm. For this reason, the reflector illumination 110 preferably mainly emits light in this region. The second outcoupling 102 couples out a part, for example about 20%, of light around 633 nm. This is the region in which, preferably, the interferometer arrangement 300 operates. With this, on the one hand the interferometer arrangement 100 receives the main part of the returning light, and on the other hand the position transducer 108 obtains a limited and well defined light beam as a basis for the tracking of the emitter-receiver unit 1. FIG. 3 represents an ideal course of the curve; a practically realised course with the applied wavelengths would correspond essentially to the settings, and differ from this with other wavelengths. As already mentioned above, the first outcoupling 101 and the second outcoupling 102 are rotated to one another, seen in the beam direction, thus the axes of the coupled-out light components are perpendicular to one another, or perpendicular (s) and parallel (p) to the plane of the drawing. Thus, the selectively transparent mirrors of the two outcouplings are arranged rotated by 90° to one another. The effect of the two mirrors on the differently polarised components of the transmitted or not outcoupled light is compensated by way of this.

The light which is not coupled out by the second outcoupling 102 is led to the range-finders 200, 300. Preferably, it is firstly led via beam-widening or concentration optics 7, and subsequently through a lambda/4 plate or quarter-wave plate 4. The optical axis of the quarter-wave plate is rotated by 45 degrees with respect to the C-axis of the crystal of the electro-optical modulator 205 and the exit polarisation of the interferometer arrangement 300 light. It only influences the wavelength of the ADM arrangement in an exact manner, and results in low signal losses at the wavelength of the interferometer arrangement 300. Alternatively, a quarter-wave plate 4 acting in a broadband manner may also be applied, which acts on both wavelengths in an as ideal as possible manner. In a further preferred embodiment of the invention, the quarter-wave plate 4 is arranged along the beam course further towards the outcouplings or outside the outcouplings. Also, certain asymmetries of the outcouplings are compensated by way of this, but the quarter-wave plate 4 must be larger for this.

The light, subsequent to the quarter-wave plate 4, is divided by way of a wavelength-dependent beam splitter 320 into the components of the ADM-arrangement 200 and of the interferometer arrangement 300. For example, the ADM-arrangement 200 operates with a wavelength of 780 nm, and the interferometer arrangement 300 with a wavelength of 633 nm.

The ADM-arrangement 20 has a laser diode 201 for producing a measurement light beam. The light beam which goes out from this, is led through an insulator 202 for shielding returning light, onto a polarising beam splitter 203, and from there through an electro-optical modulator 205 to the wavelength-dependent beam splitter 320. The outgoing light beam via the wavelength-dependent beam splitter 320 gets to the target 5 in the reverse sequence via the previously described elements, and is reflected there. The returning light is led in the ADM-arrangement 200 through the polarising beam splitter 203 onto an ADM-detector 204. The manner of acting of such an ADM-arrangement 200 is basically known. Other ADM-arrangements and methods may be applied, with which the measurement light beam may be coupled in and out for example by way of the wavelength-dependent beam splitter 320. One example of such an ADM is described in detail in WO 03/062744 A1. Basically here, as in the other embodiments of the invention, one may also apply different types of ADM such as phase meters.

The interferometer arrangement 300 uses light of a NeHe-laser 301, which in this embodiment of the invention is not arranged in the emitter-receiver unit 1, but in the intermediate unit 2. The light of the HeNe-laser 301 is led via an optical waveguide 501 to the interferometer arrangement 300. Thereby, in each case collimators 600 are arranged in the known manner at the ends of the optical waveguide 501. The collimators 600 are either designed as a part of the closure of the optical waveguides, for example as grin (graded index) collimators, with an exit beam of for example 0.5 mm diameter. Alternatively, a lens for collimation or as a beam shaper may be arranged in front of the end of an optical waveguide, for an exit beam of, for example, approx. 5 mm diameter.

The light exiting from the optical waveguide 501 is divided up by way of a beam splitter 302 into a reference light path 305 and a measurement light path. The measurement light path leads through an acousto-optical modulator 303 and together with the reference light path hits a polarising beam splitter 304. The polarising beam splitter 304 leads the measurement light further to the wavelength-dependent beam splitter 320 and guides the returning measurement light together with the reference light via a polarisation filter 306 for producing the interfering polarisation components below 45°, to an interferometer detector 307. The manner of acting of such an interferometer arrangement 300 is basically known. Other interferometer arrangements and methods with which the measurement light beam may be coupled in and out by way of, for example, the wavelength-dependent beam splitter 320, may likewise be applied. One example of such an interferometer is described in detail in WO 03/062744 A1. The described principle is that of a heterodyne interferometer. Basically here other types of interferometers (Michelson with square detection, Zeeman-Split) may be applied in the other embodiments of the invention.

Only one of the two distance measurement devices 200, 300 are present in further variants of this as well as the further embodiments, which are not described in detail.

Figure 4:
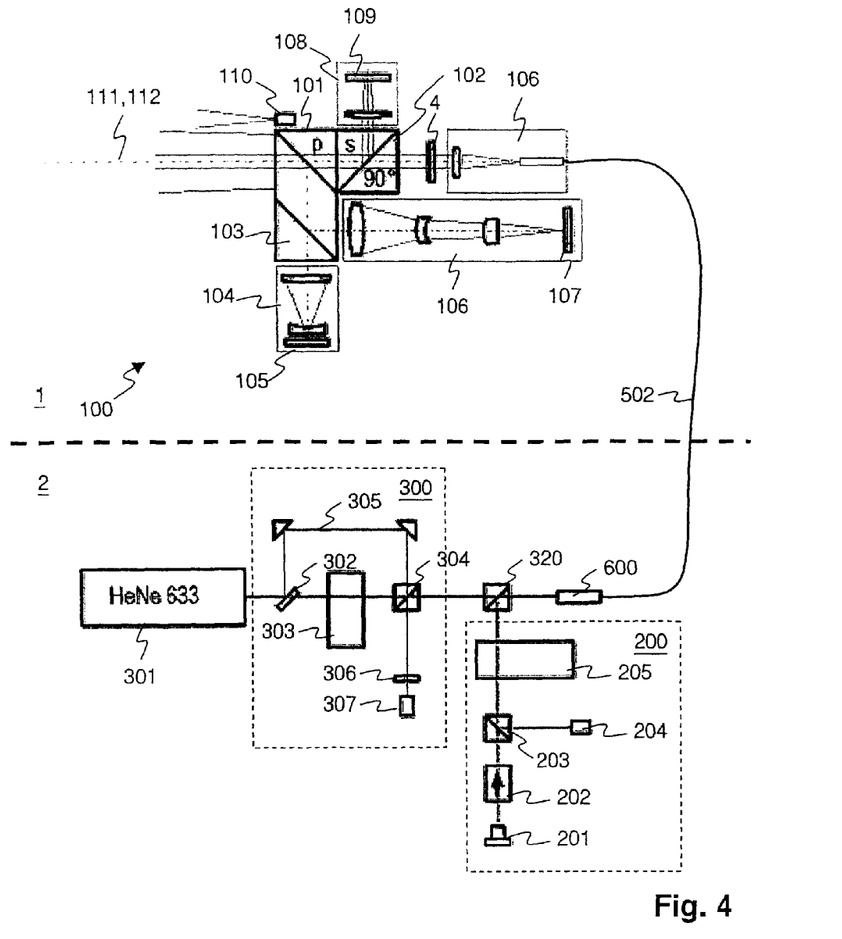
FIG. 4 an arrangement with range-finders separated via an optical waveguide.

FIG. 4 shows an arrangement with range-finders 200, 300 separated via precisely one optical waveguide. Moreover in this arrangement, the beam path 111 of the zoom camera 106 is coaxial with the beam path 112 of the range-finders 200, 300 in the region between the carrier arrangement 100 and the target 5. Only the differences to the preceding embodiment according to FIG. 2 are explained hereinafter, and the remaining elements have the same basic structure and function.

The incident light which is separated away by the first outcoupling 101, is separated once again after this first outcoupling 101 by a third outcoupling 103, and is divided onto the overview camera 104 and the zoom camera 106. Preferably, these two cameras are optimised to a function in different wavelength regions in each case.

In one variant of the embodiment according to FIG. 4, the ADM-arrangement 200, the HeNe-laser 301 and the interferometer arrangement 300 are arranged on the base element 3 instead of the intermediate unit 2, and are optically connected to one another via the commonly applied optical waveguides 502.

Figure 5:
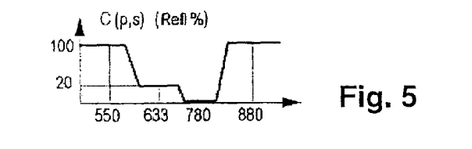
FIG. 5 reflection characteristics of outcouplings applied therein.

FIG. 5 shows reflection characteristics of the outcouplings which are applied therein. In contrast to the previous embodiment, the first outcoupling 101, apart from wavelength regions about 550 nm, also couples out those around 880 nm and thereabove. The third outcoupling 103 separates these from one another, and lead that of about 880 nm to the zoom camera 106, and that of about 550 nm to the overview camera 104.

The measurement light components of the range-finders 200, 300, after the second outcoupling 102 by the quarter-wave plate and a beam shaper 6, are led into an optical waveguide 502 through which, in reverse, the measurement beams emitted by the range-finders 200, 300 are also led out. The beam shaper 6 widens the measurement light beam to 4-5 mm and is applied, for example, instead of a grin collimator.

The optical waveguide 502 transfers the polarisation components independently of one another, thus maintains the polarisation. Such an optical waveguide has a preferred axis or main axis (whose orientation is defined by projection onto a plane perpendicular to the fiber direction), along which the light must be polarised, in order to be transmitted in an equally polarised manner. It has been found that this maintenance of the polarisation also takes place for a polarisation direction perpendicular to this main axis.

The previously described elements of this embodiment are arranged in the emitter-receiver unit 1 and are movable with the emitter-receiver unit 1. The optical waveguide 502 leads to the remaining elements which are arranged on the intermediate unit 2 and are movably arranged with this. These remaining elements are the ADM-arrangement 200, the interferometer arrangement 300 and the assigned HeNe-laser 301. Analogously to the embodiment of FIG. 2, the measurement beams of these two range-finders are led together, or separated by the wavelength-dependent beam splitters 320. The wavelength-dependent beam splitter 320 is likewise arranged on the intermediate unit 2.

Figure 6:
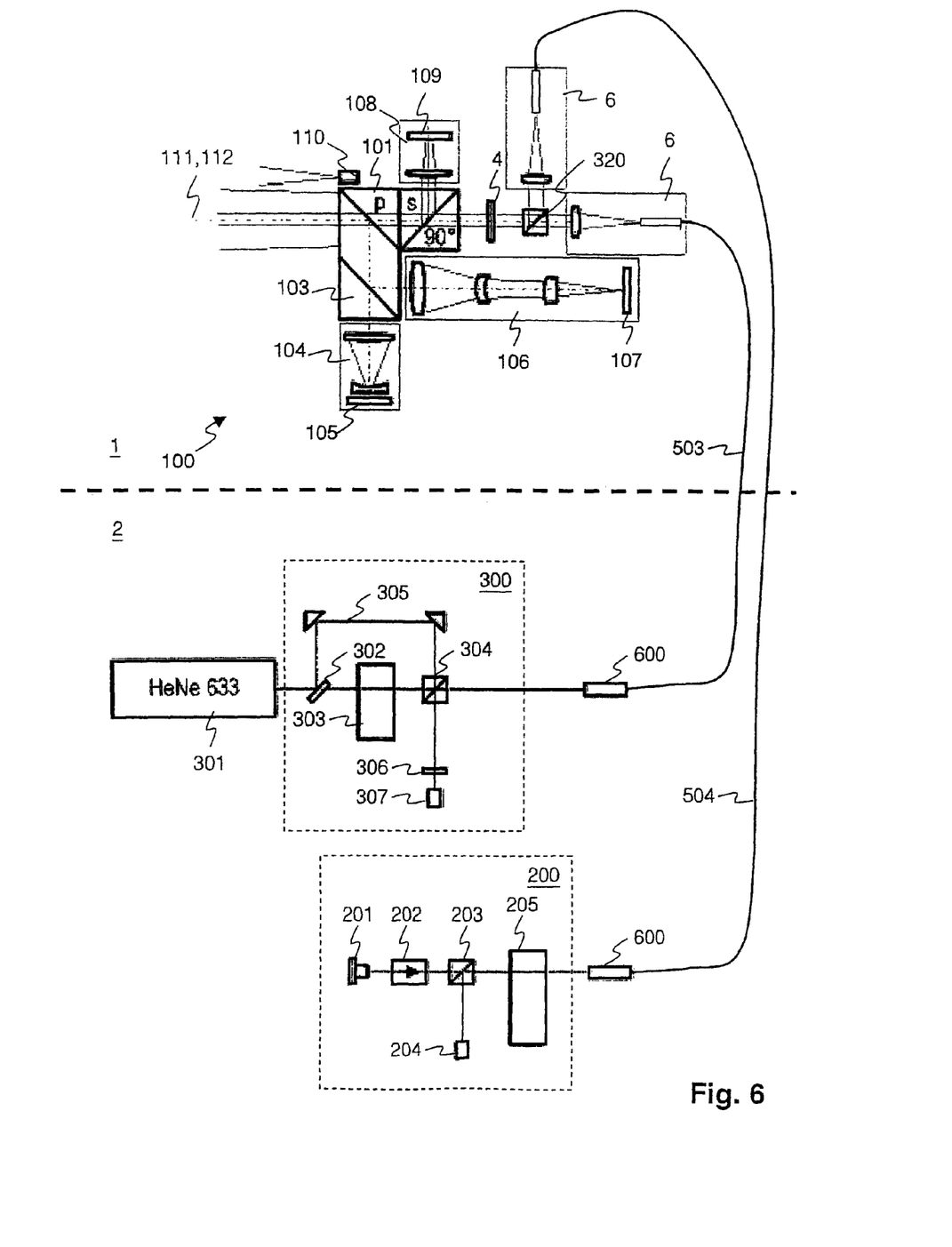
FIG. 6 an arrangement with range-finders separated via two optical waveguides.

FIG. 6 shows an arrangement with range-finders separated via two optical waveguides. The carrier arrangement 100, here, is shown in the same manner as in the embodiment according to FIG. 4, and the reflection characteristics of outcouplings 101, 102, 103 applied therein is also the same.

However, alternatively in both embodiments, the elements may also be arranged in a biaxial manner. The dividing of the arriving light beams by the wavelength-dependent beam splitter 320 is effected here after the quarter-wave plate 4, in the emitter-receiver unit 1. The divided beams for the two range-finders 200, 300 are led via, in each case, their own polarisation-maintaining optical waveguides 503, 504 to the intermediate unit 2. The ADM-arrangement 200, the interferometer arrangement 300 and the HeNe-laser 301 are arranged on the intermediate unit 2 and movable with this. In one variant of this embodiment, the ADM-arrangement 200 or the HeNe-laser 301 and optionally also the interferometer arrangement are arranged on the base unit 3. Instead of collimators, for example, beam shapers 6 for beam widening are applied in the emitter-receiver unit 1.

The two optical waveguides 503, 504 are, in each case, preferably led individually via the right and left support of the emitter-receiver unit 1 through the zenith axis Z, for thermal-technical reasons and for reasons of space.

In the embodiments of FIGS. 4 and 6, the length change of the optical waveguides 502, 503, 504 due to heating is taken into account. This is preferably effected by way of measuring a temperature, for example the temperature in the apparatus. In a preferred variant of the invention, a metal wire, for example of nickel, is led parallel and as close as possible to an optical waveguide, for example in the casing of the optical waveguide. An average temperature of the wire is evaluated by way of the electrical resistance of the wire with a resistance measuring device. An average length change of the optical waveguide is determined from this, and used for the correction of the distance measurement.

Figure 7:
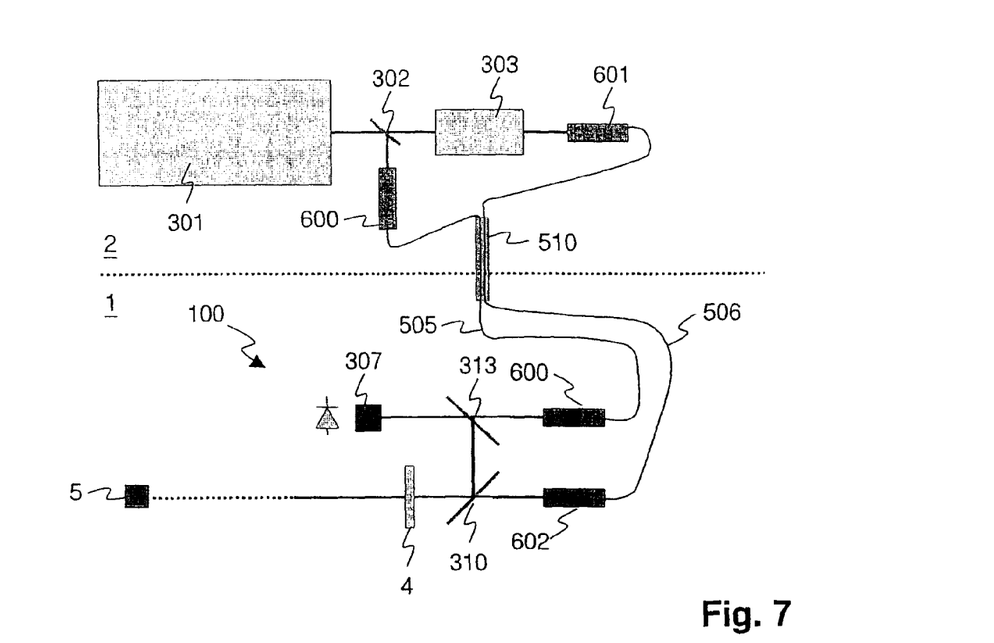
FIG. 7 an arrangement with an interferometric range-finder partly separated via two optical waveguides,
FIG. 8 an arrangement with an absolute range-finder separated via an optical waveguide.

FIG. 7 shows an arrangement with an interferometric range-finder which is partly separated via two optical waveguides. In this arrangement, the HeNe-laser 301 and the acoustic-optical modulator (AOM) 303 of the interferometer arrangement 300 are removed from the carrier or the emitter receiver unit 1, and are located on the intermediate unit 2. Proceeding from the HeNe-laser 301, the laser beam with the beam splitter 302 is divided onto a measurement path and onto a reference path, wherein the reference path has the smaller component of energy, for example about 10%. The reference path leads via a first polarisation-maintaining optical waveguide 505, and the measurement path leads via an acousto-optical modulator 303 and thereafter via a second polarisation-maintaining optical waveguide 506. This separate leading of the measurement path and reference path reduces the temperature influence, since both paths at least approximately are subjected to temperature fluctuations to the same extent. For this, the two optical waveguides are arranged in a common guide or casing 510. In each case, collimators 600 for grouping or widening the light beams are arranged at the beginning and at the end of the optical waveguides 505, 506. The collimator 601 or the fiber incoupling at the acousto-optical modulator 303 acts as a filter for components of the first order, which means only the frequency-shifted component is coupled into the optical waveguide 506. The measurement path and reference path from the intermediate unit are led through the two optical waveguides 505, 506 to the emitter-receiver unit 1, where the interference of the reference light beam and of the measurement light beam takes place. For this, the returning measurement light beam is led through a polarising beam splitter 310, separated from the outgoing measurement light beam, and led to a beam splitter 313. This beam splitter 313 superimposes the measurement light beam with the reference light beam and leads both onto the interferometer detector 307. The two beam splitters 310, 313 and the interferometer detector 307 are, thus, arranged on the emitter-receiver unit 1.

The acousto-optical modulator 303 acts as an insulator for reflected measurement beams, so that no additional insulation is necessary for the protection of the HeNe-laser 301. Alternatively, it is also possible to modulate the reference light instead of the measurement light, wherein then however an insulator must be arranged in the measurement light path.

The collimator 602 preferably has a relatively large focal width of, for example, 18 mm and thus produces an adequate diameter of the measurement beam of for example 4-5 mm. Alternatively, the focal width of the collimator 602 has a short focal width of for example 2 mm, and a Galileo telescope connecting thereto is arranged in front of the end of the respective optical waveguide (not drawn separately), as in the embodiments according to FIGS. 4 and 6.

In this embodiment of the invention, the heat-producing elements are in the intermediate unit 2 and are distanced to the heat-sensitive optical elements in the emitter-receiver unit 1.

Figure 8:
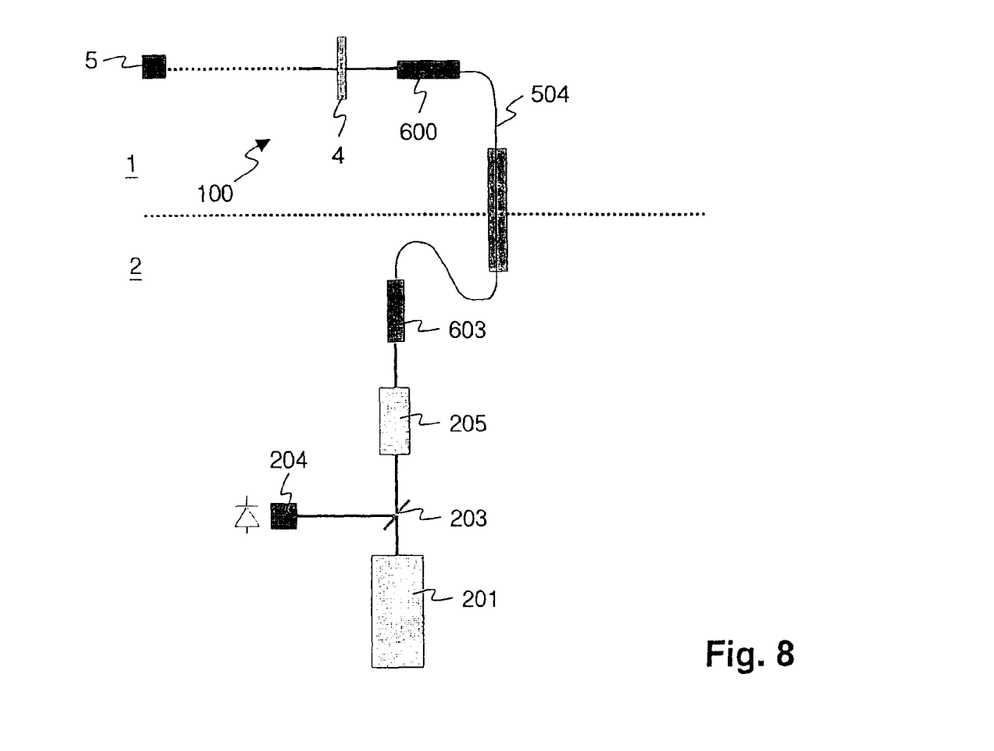

FIG. 8 shows an arrangement with an absolute range-finder which is separated via an optical waveguide. Only the quarter-wave plate 4 and a collimator 600 for the optical waveguide 504 are arranged on the emitter-receiver unit 1. The arrangement of the quarter-wave plate 4 on the emitter-receiver unit 1 serves for compensating different phase delays in the optical waveguide 504. With the exiting beam, components of the laser beam which are orthogonal to one another are subjected to a different and unknown delay. After the phase shift of 90°, which means after the conversion into circularly polarised light by the quarter-wave plate 4, reflection by the target 5 and the renewed phase shift by the quarter-wave plate 4, the components are rotated by 90 degrees, thus are exchanged with respect to the main axes of the optical waveguide 504. Each component, thus, on the return path experiences the delay which the other component had experienced on the outgoing path. Differences in the delay are compensated by way of this. At the collimator 603, the polarisation axes of the optical waveguide 504 are aligned to the polarisation axes of the electro-optical modulator 205, thus parallel to this, in order for the compensation to act in an optimal manner.

Figure 9:
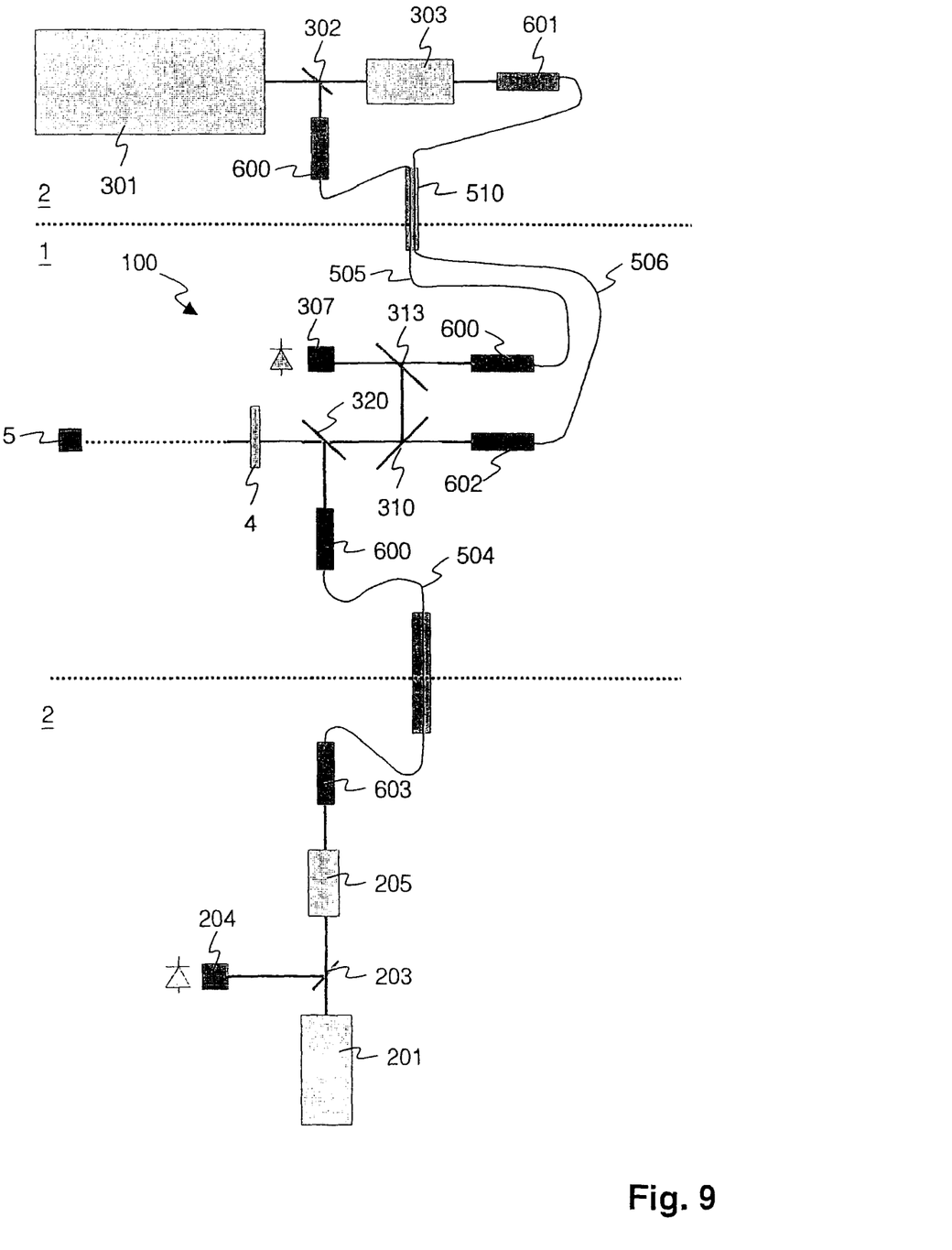
FIG. 9 a combination of the arrangements from FIGS. 7 and 8.

FIG. 9 shows a combination of the arrangements of the FIGS. 7 and 8. The measurement beams of the ADM-arrangement 200 and the interferometer arrangement 300 are superimposed on, or separated from one another in the emitter-receiver unit 1 by a wavelength-dependent beam splitter 320. The quarter-wave plate 4 is optimised to the ADM-measurement and is simultaneously designed with regard to a minimal influence and losses for the interferometer measurement. The measurement light beams of the two range-finders are, thus, led in a separate manner via their own optical waveguides 504, 505, 506 to or from the intermediate unit 2. Thereby, preferably the optical waveguide 504 of the ADM-arrangement 200 is led via a first support 21, and the optical waveguides 505, 506 of the interferometer arrangement 300 via a second support 22. This separate leading permits individual components of the two range-finders to be arranged separately in the two supports 21, 22. In another variant of this embodiment, the elements of the ADM arrangement 200 or the elements of the interferometer arrangement 300, which are arranged in the intermediate unit in FIG. 9, are arranged in the base unit 3 instead.

The quantity of optical components in the emitter-receiver unit 1 with this, is kept as small as possible and in particular heat sources are arranged in the intermediate unit 2 and not in the emitter-receiver unit 1.

Figure 10:
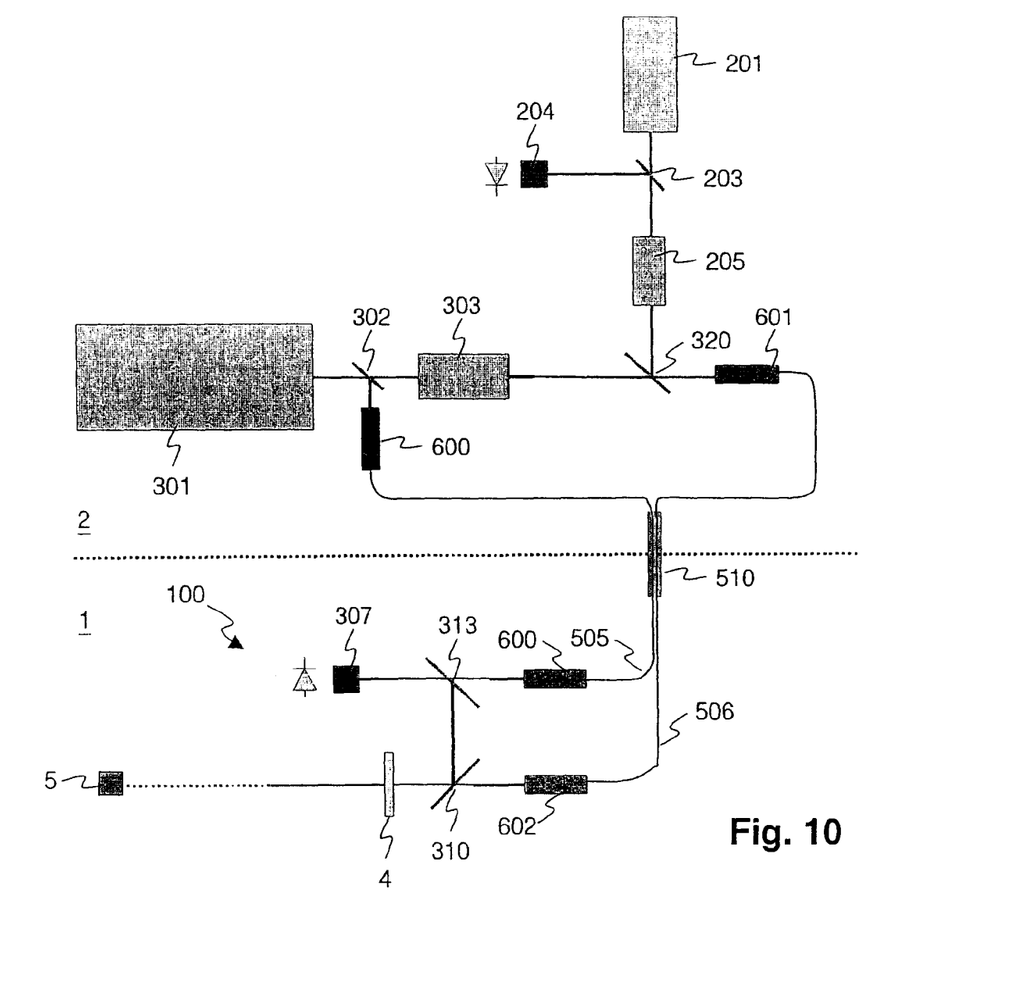
FIG. 10 a combination of the arrangements from the FIGS. 7 and 8, with a multiple use of one of the optical waveguides,
FIG. 11 a further arrangement with an interferometric range-finder which is partly separated via two optical waveguides.

FIG. 10 shows a combination of the arrangements of FIGS. 7 and 8 with a multiple use of the optical waveguides. The measurement beam produced by the ADM-arrangement 200 therein is coupled into the measurement beam of the interferometer arrangement 300. Preferably, this incoupling is arranged with a wavelength-dependent beam splitter 320 between the acousto-optical modulator 303 and the assigned collimator 600.

The arrangement in the emitter-receiver unit 1 is structurally the same as in FIG. 7. The polarising beam splitter 310 in the emitter-receiver unit 1 acts only on the wavelength region of the interferometer, and thus, reflects at least a part of the returning light of the interferometer to the beam splitter 313 and thus to the interferometer detector 307. The light component of the ADM is essentially let through the polarising beam splitter 310, and gets through the same fibers 506 and the wavelength-independent beam splitter 320 on the intermediate unit 2, to the ADM-arrangement 200. This optical waveguide 506 has a cut-off wavelength for single-mode propagation, which lies below the wavelength of the ADM (for example 780 nm) as well as of the interferometer (for example 633 nm).

This embodiment of the invention permits a high integration of ADM and interferometer, and a small number of optical elements on the emitter-receiver unit 1. No particular effort is necessary in order to achieve a good covering of the beams of the two range-finders, since the beams are combined with one another already in front of the optical waveguide 506, and run through the same optics in the emitter-receiver unit 1.

Figure 11:
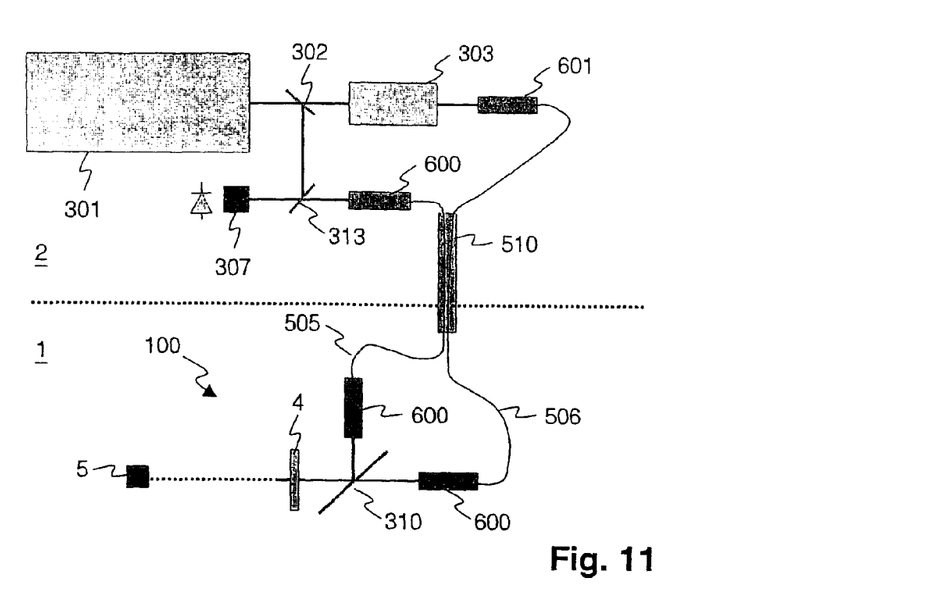

FIG. 11 shows a further arrangement with an interferometric range-finder which is partly separated via two optical waveguides. The interferometer detector 307 here is arranged in the intermediate unit 2, and likewise the associated beam splitter 313. Thus no electrical components of the interferometer are arranged in the emitter-receiver unit 1. Common length changes of the optical waveguides 505, 506 however no longer mutually compensate one another. For this reason, a temperature measurement and compensation is preferably integrated, for example as described above, with a measurement wire parallel to the optical waveguides 505, 506.

Figure 12:
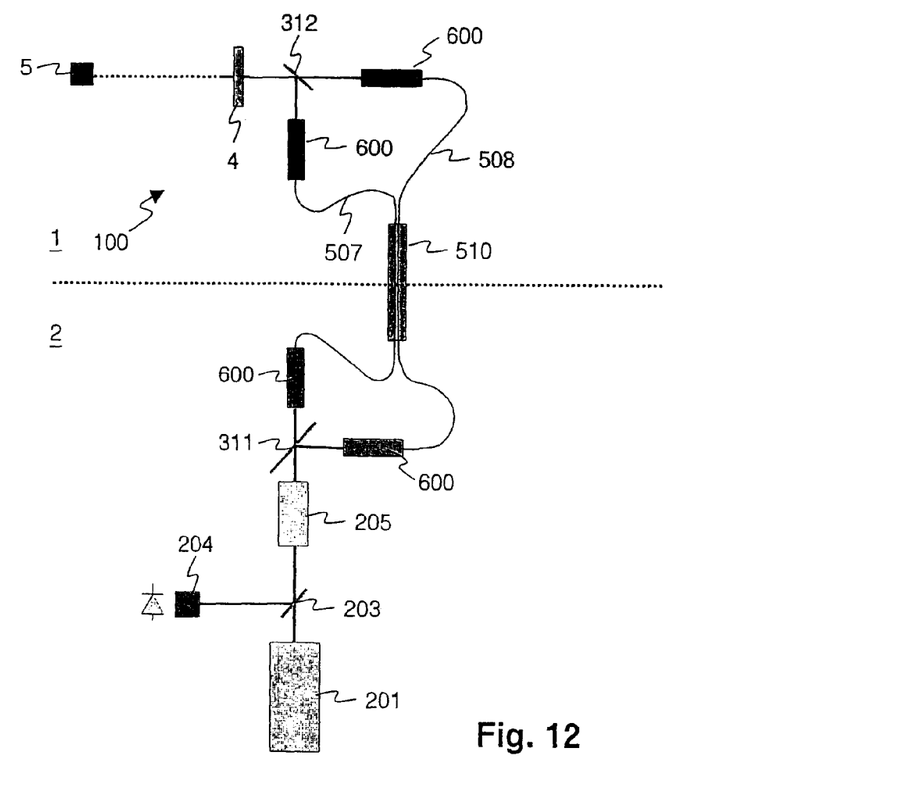
FIG. 12 an arrangement with an absolute range-finder, which is partly separated over two optical waveguides.

FIG. 12 shows an arrangement with an absolute range-finder which is partly separated via two optical waveguides 507, 508. The beam exiting from the electro-optical modulator 205 is divided up in a polarising beam splitter 311 onto the collimators 600 of the two optical waveguides 507, 508, which are orientated with their main axes parallel to the axes of the polarising beam splitter 311.

The two components of the beam are combined in a further polarising beam splitter 312 in the emitter-receiver unit 1 and are emitted by the quarter-wave plate 4. The retuning light once again runs through the quarter-wave plate 4. Each of the components is rotated as a whole by 90 degrees and is led through the further polarising beam splitter 312 for the return path in each case onto the other optical waveguide 507, 508 compared to the outgoing path. A different phase shift of the components between optical waveguides 507, 508 thus has no influence. The same applies to a different absorption of the components.

Figure 13:
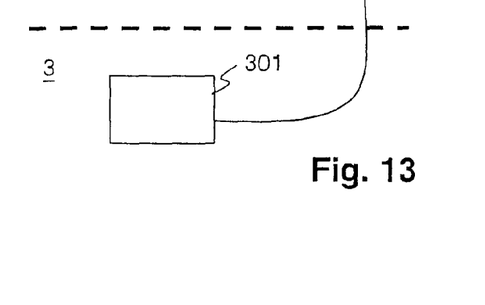
FIGS. 13 and 14 further arrangements of range-finders, which are separated in sub-units.
Figure 14:
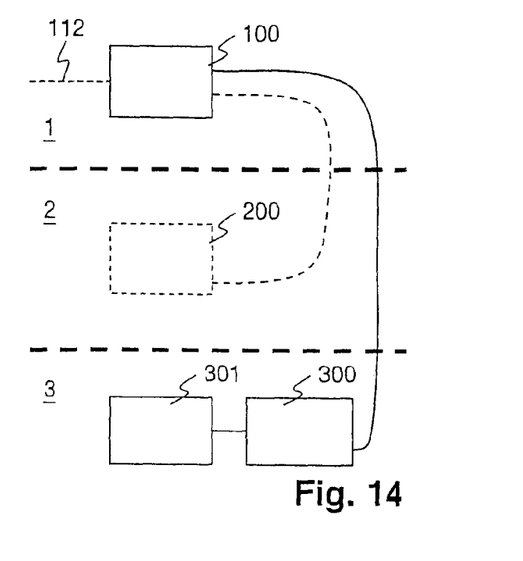

FIGS. 13 and 14 show further arrangements of range-finders, which are separated in sub-units. Thereby, individual ones of the sub-units are also arranged on the base unit 3. This is particularly advantageous for heavy sub-units and/or sub-units with relatively high thermal losses. In the arrangement of FIG. 13, the HeNe-laser 301 is arranged in the base unit 3 and is connected to the interferometer arrangement 300 in the carrier arrangement 100 via an optical waveguide. In the arrangement of FIG. 14, apart from the HeNe-laser 301, the interferometer arrangement 300 is also arranged in the base unit 3. The ADM-arrangement 200 in these two variants is in each case arranged in the intermediate unit 2. The ADM-arrangement 200 is drawn in a dashed line, by which means it is indicated that it may alternatively also be arranged in the carrier arrangement 100.

LIST OF REFERENCE NUMERALS

A azimuth axis
Z zenith axis
1 emitter-receiver unit
2 intermediate unit
3 base unit
4 quarter-wave plate
5 target
6 beam shaper
7 widening optics
21 first support
22 second support
10 measurement light beam
100 carrier arrangement
101 first outcoupling
102 second outcoupling
103 third outcoupling
104 overview camera
105 image converter of the overview camera 104
106 zoom camera
107 image converter of the zoom camera 106
108 position transducer
109 position-sensitive diode
110 reflector illumination
111 optical axis of the zoom camera
112 optical axis of the range-finder
200 ADM-arrangement
201 laser diode
202 insulator
203 polarising beam splitter
204 ADM detector
205 electro-optical modulator
300 interferometer arrangement
301 HeNe-laser
302 beam splitter
303 acousto-optical modulator
304 polarising beam splitter
305 reference light path
306 polarisation filter
307 interferometer detector
310-312 polarising beam splitter
313 beam splitter
320 wavelength-dependent beam splitter
321 insulator
501-508 optical waveguide
510 double fibre leading
600-603 collimator

The invention claimed is:
1. A coordinate measurement apparatus, comprising:
at least one optical distance measurement device (200, 300) for measuring the distance to a measurement aid (5) movable in space, and with a first measurement and control loop for tracking the measurement aid (5),
a zoom camera (106) which is rotated with respect to at least two axes, with a zoom objective and with a second measurement and control loop for keeping constant the size of an image of the measurement aid (5) on an optoelectronic image converter (107) of the zoom camera (106), and an overview camera (104) for the coarse localization of the measurement aid (5), wherein the overview camera (104) has an aperture angle of 10° or more, wherein light exit optics and light receiver optics (101, 102) of the distance measurement device (200, 300), the zoom camera (106) and the overview camera (104) are arranged on a common carrier (1) which is rotatable with respect to at least two axes (A, Z), and wherein the optical axis (112) of the distance measurement device (200, 300) and the optical axis (112) of the overview camera (104) run coaxially outside the coordinate measurement apparatus.

2. A coordinate measurement apparatus according to claim 1, wherein a first outcoupling (101) of light to the overview camera (104) is arranged in the beam path of a received light bundle.

3. A coordinate measurement apparatus according to claim 2, wherein a second outcoupling (102) of light to a sensor (108) is arranged subsequent to the first outcoupling, said sensor providing a measurement variable for tracking the measurement aid.

4. A coordinate measurement apparatus according to claim 3, wherein the first outcoupling (101) couples out light into a first outcoupling direction, and the second outcoupling (102) couples out light into a second outcoupling direction, wherein the first outcoupling direction and the second outcoupling direction, seen in the direction of the received light bundle, run approximately perpendicular to one another.

5. A coordinate measurement apparatus according to claim 1, wherein the overview camera (104) provides a measurement variable for tracking the measurement aid.

6. A coordinate measurement apparatus according to claim 1, wherein the overview camera (104) and the zoom camera (106) are not identical.

7. A coordinate measurement apparatus according to claim 1, wherein the overview camera (104) and the optical distance measurement device (200, 300) are not identical.

8. A coordinate measurement apparatus according to claim 1, wherein the beam path of the zoom camera (106) and the beam path of the distance measurement device (200 300) are led via in each case separate exit optics.

9. A coordinate measurement apparatus according to claim 3, wherein an optical axis (11) of the zoom camera (106) runs, outside the coordinate measurement apparatus, coaxially to optical axes (112) of the distance measurement device (200, 300) and the overview camera (104).

10. A coordinate measurement apparatus according to claim 9, wherein a third outcoupling (103) is arranged in the beam path of the light coupled out from the first outcoupling (101), and the third outcoupling (103) is arranged for coupling out light to the zoom camera (106).

11. A coordinate measurement apparatus according to claim 3, wherein at least one of the outcouplings (101, 102, 103) is a wavelength-dependent beam splitter.

12. A coordinate measurement apparatus according to claim 8, wherein an electro-optical image converter (107) of the zoom camera (106) is arranged asymmetrically with respect to an optical axis (111) of the zoom camera, and the middle point of the image converter is displaced away from an optical axis (112) of the distance measurement device (200, 300) with respect to the optical axis (111) of the zoom camera (106).

13. A coordinate measurement apparatus, comprising:

at least one optical distance measurement device (200, 300), means for irradiating and for receiving light, and an emitter-receiver unit (1) which is rotatably arranged about an axis (Z) with respect to an intermediate unit (2), wherein the intermediate unit (2) is rotatably arranged about a further axis (A) with respect to a base unit (3), by which means the emitter-receiver unit (1) is rotatably arranged with respect to the base unit (3) about two axes (A, Z), wherein the optical distance measurement device (200, 300) comprises a first sub-unit which is arranged on the emitter-receiver unit (1) and moved with the emitter-receiver unit, wherein the optical distance measurement device (200, 300) comprises a second sub-unit, and at least one optical waveguide (501-508) for transmitting light is arranged between the first and the second sub-unit of the distance measurement device (200, 300), and wherein the second sub-unit is arranged on the intermediate unit (2) and moved with the second sub-unit.

14. A coordinate measurement apparatus according to claim 13, wherein at least one optoelectronic detector (204, 307) of the at least one distance measurement device (200, 300) is arranged in the emitter-receiver unit (1).

15. A coordinate measurement apparatus according to claim 13, wherein an emitted and a returning light beam of the at least one distance measurement device (200, 300) are led through the same optical waveguide (501-504) between the first and the second sub-unit.

16. A coordinate measurement apparatus according to claim 13, wherein an emitted and a returning light beam of the at least one distance measurement device are led through separate optical waveguides (505, 506) between the first and the second sub-unit.

17. A coordinate measurement apparatus according to claim 13, comprising a first and a second distance measurement device (200, 300), wherein light beams of the two distance measurement devices are led in each case through separate optical waveguides (503, 504; 505,506) between the first and the second sub-units.

18. A coordinate measurement apparatus according to claim 13, comprising a first and a second distance measurement device (200, 300) with, in each case, an emitted and a returning light beam, wherein at least one of the light beams of the first distance measurement device (200) and one of the light beams of the second distance measurement device (300) are led through the same optical waveguide (506) between the first and the second sub-unit.

19. A coordinate measurement apparatus according to claim 13, comprising a first and a second distance measurement device (200, 300) with, in each case, an emitted and a returning light beam, wherein all light beams of the first as well as the second distance measurement device (200, 300) are led through the same optical waveguide (502) between the first and the second sub-unit.

20. A coordinate measurement apparatus according to claim 13, wherein a light source (301) is arranged in the intermediate unit (2), and the remaining elements of the at least one distance measurement device (200, 300) are arranged in the emitter-receiver unit (1).

21. A coordinate measurement apparatus according to claim 13, wherein individual sub-units of the at least one distance measurement device (200, 300) are also arranged on the base unit (3) and are connected via optical waveguides to other sub-units on the intermediate unit (2) and/or emitter-receiver unit (1), and at least one light source is arranged on the base unit (3).

22. A coordinate measurement apparatus according to claim 13, wherein a quarter-wave plate (4) is arranged in the beam path of the emitted as well as the returning light of at least one of the at least two measurement devices (200, 300), in the emitter-receiver unit (1).

23. A coordinate measured apparatus according to claim 13, wherein the at least one optical waveguide (501, 508) is a polarisation-maintaining optical waveguide.

* * * * *